United States Patent
Maze

(10) Patent No.: US 8,200,642 B2
(45) Date of Patent: Jun. 12, 2012

(54) SYSTEM AND METHOD FOR MANAGING ELECTRONIC DOCUMENTS IN A LITIGATION CONTEXT

(76) Inventor: Gary R. Maze, Houston, TX (US)

( * ) Notice: Subject to any disclaimer, the term of this patent is extended or adjusted under 35 U.S.C. 154(b) by 178 days.

(21) Appl. No.: 12/821,031

(22) Filed: Jun. 22, 2010

(65) Prior Publication Data

US 2010/0325102 A1 Dec. 23, 2010

Related U.S. Application Data

(60) Provisional application No. 61/219,609, filed on Jun. 23, 2009.

(51) Int. Cl.
*G06F 7/00* (2006.01)
(52) U.S. Cl. ........................................................ 707/694
(58) Field of Classification Search ........................ None
See application file for complete search history.

(56) References Cited

U.S. PATENT DOCUMENTS

| | | | |
|---|---|---|---|
| 7,058,661 | B2 | 6/2006 | Ciaramitaro et al. |
| 7,197,716 | B2 | 3/2007 | Newell et al. |
| 7,293,006 | B2 | 11/2007 | Beckius et al. |
| 2003/0112270 | A1 | 6/2003 | Newell et al. |
| 2005/0203814 | A1 | 9/2005 | Derny et al. |
| 2005/0204191 | A1 | 9/2005 | McNally et al. |
| 2006/0277054 | A1 | 12/2006 | Benzrihem et al. |
| 2007/0226204 | A1* | 9/2007 | Feldman ............................ 707/5 |
| 2008/0250013 | A1 | 10/2008 | Gruskin et al. |

OTHER PUBLICATIONS

Evaluating E-Discovery Software Vendors—Important Questions to Ask, The Illinois Business Law, 2008-0402, USA.
Information on ImageMaker Discovery Assistant (ie cost and licensing), udated.
Findlaw.com—Market Center (General Practice Software) Information.
The Size, Scope and Growth of electronic Data Discovery Market: Survey & Results, G. Socha & T. Gelbmann, undated.
E-Discovery Tools—information on product re E-Discovery Processor.
Ready to Rumble: when Litigators Prepare for Trial, or, More Commonly Prepare to Bury Their Foes in Paper They Want every Possible Advantage—Including Technology, The American Lawyer, Feb. 2004.

* cited by examiner

*Primary Examiner* — Truong Vo
(74) *Attorney, Agent, or Firm* — Gary R. Maze; Berenbaum Weinshienk PC

(57) ABSTRACT

A system and method for production of analyzing electronic documents includes document acquisition software; a database, comprising a document table; a document parser; a categorization schema; and a document processor operatively in communication with the database and the categorization schema. Document acquisition software operatively resident in a first computer acquires an electronic document which is then parsed by a document parser operatively resident in a second computer to create a set of parsed data related to the acquired document. A predetermined set of data describing the parsed document, comprising the created parsed data, are stored into a document table of a database accessible to the second computer. A non-neural network process is used to process the created parsed data in a document processor operatively resident in a third computer according to a categorization schema to create an association between the acquired document and the categorization schema.

22 Claims, 12 Drawing Sheets

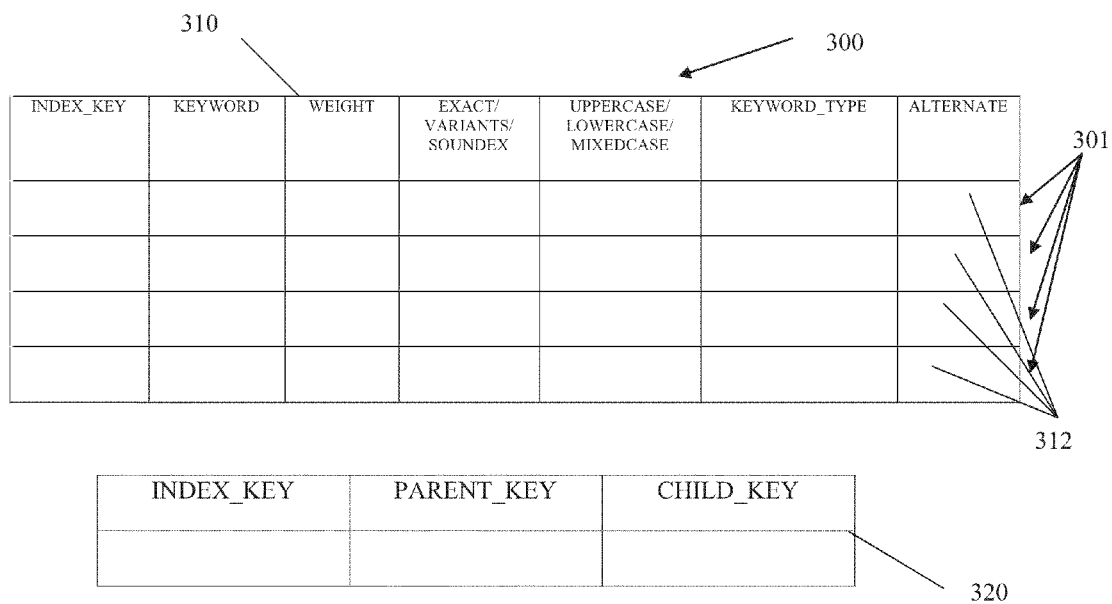
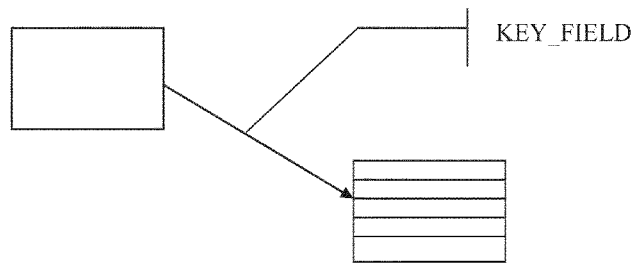
FIGURE 2
FIGURE 2A

\*
\*
\*

DECISION CRITERIA:

| +DOCUMENT +WEIGHT +RELEVANCE |

DOCUMENTS UNCOVERED:

| C:\DOCS\A\1.TXT | 1523 |
| C:\DOCS\A\2.TXT | 1325 |
| C:\DOCS\A\3.TXT | 1253 |
| C:\DOCS\A\4.TXT | 999 |
| C:\DOCS\A\5.TXT | 750 |
| C:\DOCS\A\6.TXT | 650 |

THRESHOLD SET TO 75%
OTHER KEYWORDS PRESENT IN 75% OF THE DOCUMENTS UNCOVERED:

FRED (87%) DERF (83%) GEORGE (77%) MARTHA (77%)

FIGURE 6

SYSTEM AND METHOD FOR MANAGING ELECTRONIC DOCUMENTS IN A LITIGATION CONTEXT

The application claims priority through U.S. Provisional Application 61/219,609, filed Jun. 23, 2009.

BACKGROUND OF THE INVENTION

The invention relates to a system and method for managing electronic document capture, review, analysis, and production according to one or more categorization schema. More specifically, in various embodiments the invention relates to a system and method for managing electronic document capture, review, analysis, and production according to one or more categorization schema form documents and other electronic files such as may be produced electronically during a discovery period of litigation according to a categorization schema or which may be examined during a patent or trademark application process.

DESCRIPTION OF THE PRIOR ART

Businesses and institutions today maintain massive volumes of electronic and paper data. The current rules of litigation discovery in many states, as well the federal rules, allow for discovery of these electronic and paper data. Recent changes now provide for virtually mandatory production of these electronic and paper data in their original electronic form. Litigating parties, among others, now and in the foreseeable future must sift through and discover relevant documents and files, a process that is extremely time-consuming, labor-intensive, and expensive.

With respect to electronic discovery, the electronic discovery reference model identifies several phases. During the Information Management phase, an entity such as a corporation begins the process of getting its electronic documents in order to mitigate risk and expenses should e-discovery become an issue. In the Identification phase, potential sources of documents are located and their scope, breadth and depth determined. In the Preservation phase, documents is protected against inappropriate alteration or destruction. In the Collection phase, documents are gathered for further use in the e-discovery process (processing, review, etc.). In the Processing phase, the volume of documents is reduced and the reduced volume converted, if necessary, to forms more suitable for review and analysis. In the Review phase, documents are evaluated for relevance and privilege. In the Analysis phase, documents are evaluated for content and context, for example including key patterns, topics, people and discussion. In the Production phase, documents are delivered to others in appropriate forms, using appropriate delivery mechanisms. Finally, in the Presentation phase, documents are displayed before audiences such as at depositions, hearings, and trials.

Numerous solutions have been proposed, including full term searching and the like. Hand-coding or other coding systems are prone to transcription and other human errors. Additionally, to establish an accurate full text system, each scanned or manually keyed document must be checked against the original document to assure an accurate conversion has been achieved. Thus, the actual documents and files themselves are the best source to be searched and cataloged. Nonetheless, the benefits of full text systems have been questioned but with the advent of faster computer systems and less expensive data storage media, full text searching is more feasible.

Management and analysis of documents and files produced in litigation or other legal endeavors such as patent or trademark applications are critical processes for nearly every organization, especially law firms or other organizations that originate, handle, and distribute a large number of legal and related documents. The effective management, organization and utilization of such documents in an electronic format is of paramount importance.

Conventional electronic systems and methods for managing, organizing, and utilizing legal documents are costly and time consuming and focus solely on certain areas, such as discovery, and not on other areas that may be considered critical. Most are not scalable or adaptable, do not allow a user to search for or compile a document production set, or to batch print such a set or other documents.

Current systems and methods deal with organizing discovery, understanding significant time lines, and using the resulting data at trial. These systems are associated with finding and providing legal teams with electronic documents that are either relevant or potentially relevant to a particular inquiry, investigation, or discovery request. However, these systems and methods fail to disclose the actual associating and tracking of located documents with specific legal proceeding requests, e.g. for responding to discovery requests; the actual production of documents associated with specific discovery requests; and tracking of the produced documents. Moreover, these systems and methods disclose searching text oriented files and fail to address non-text oriented files such as video and/or audio files, graphic files, and the like.

BRIEF DESCRIPTION OF THE DRAWINGS

The various drawings supplied herein are representative of one or more embodiments of the present inventions.

FIGS. 2 and 2a are schematic representations of an illustrative table layout for a categorization table;

FIG. 6 is an exemplary form showing results of a search;

DETAILED DESCRIPTION OF EXEMPLARY EMBODIMENTS OF THE INVENTION

Throughout, the software described herein may be implementing in numerous, equivalent ways using, e.g. Microsoft® Visual Basic, Visual C++, Visual C#, Visual J#, Visual FoxPro®, or the like, or combinations thereof as appropriate. Further, as used herein, "electronic documents" and "acquired documents" are understood to include computer electronic files in whatever format and, unless specifically limited by context or modifier, includes files containing text, video, audio, graphic, and the like, or combinations thereof. As used herein, "form" is a user visually perceivable screen presentation, as will be understood by those of ordinary skill in the software programming arts. As used herein, a "module" comprises software, as will be understood by those of ordinary skill in the software programming arts. As used herein, the phrase "request for production based on a legal proceeding" means all such requests, whether triggered automatically by rule or statute, triggered by court order, or triggered by requests from a party to litigation. As used herein, documents are not illustrated in the figures but can be any document, as that term is commonly understood in the legal profession, including but not limited to electronic data files, electronic word processing or similar files, hard copies, and the like, and combinations thereof.

Figure 1:
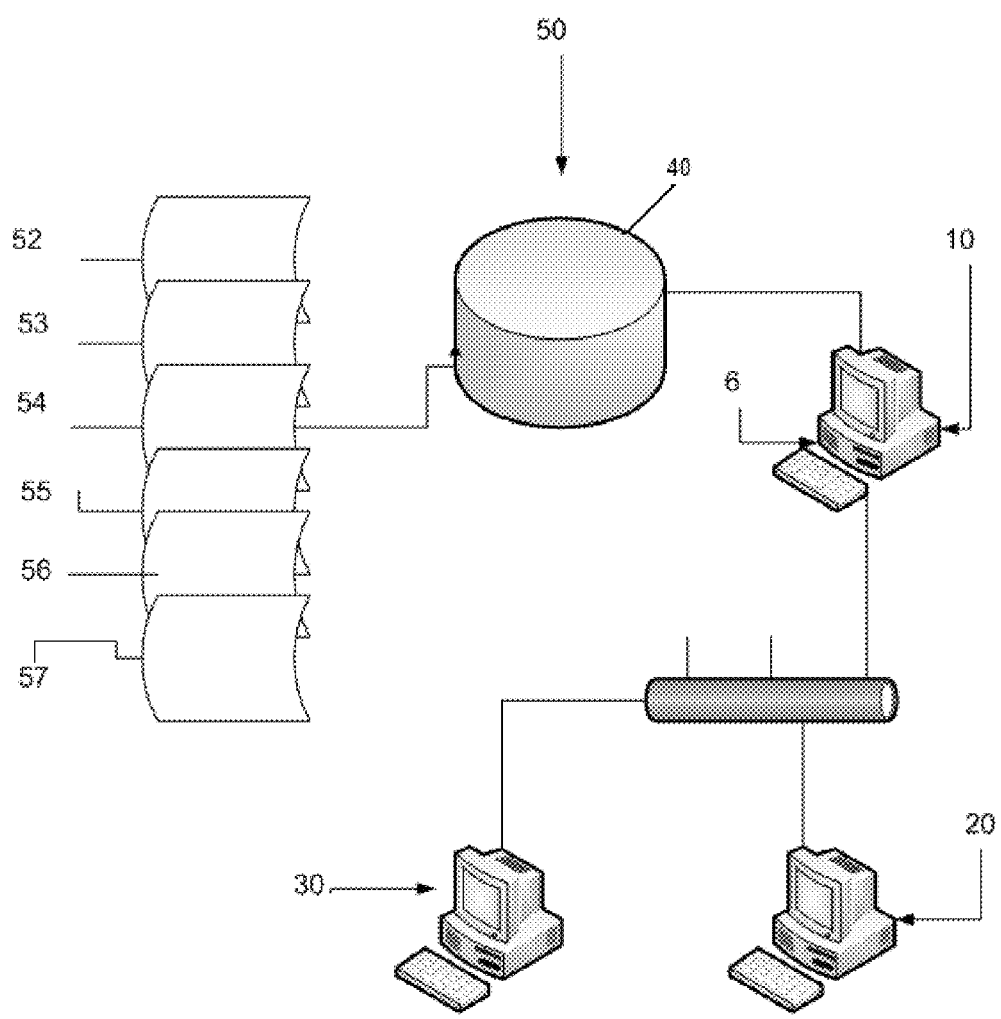
FIG. 1 is a schematic representation of an illustrative embodiment of the claimed system.

Referring now to FIG. 1, system 1 allows processing electronic documents 5 (not shown in the figures), such as may be produced during a discovery period of litigation. System 1 comprises document acquisition software 100 (FIG. 5) operatively resident in computer 10; database 50, comprising one or more tables 52, accessible to computer 10; document parser 200 (FIG. 4), operatively in communication the database 50; categorization schema 300 (FIG. 2); and document processor 400 (FIG. 3), operatively resident in one of computers 10, 20, and/or 30 and operatively in communication with database 50 and categorization schema 300.

Referring still to FIG. 1, system 1 for processing electronic documents further comprises data store 40; database 50 resident on data store 40; computer 10 operatively connected to data store 40, source 6 of electronic documents 5, and database 50; and analysis software 500 (FIG. 5) operatively resident in the computer In is understood that first computer 10, second computer 20, and third computer 30 may be the same computer or that at least two of these may be the same computer, i.e. first computer 10 and second computer 20, first computer 10 and third computer 30, second computer 20 and third computer 30 may all be the same computer. If there are a plurality of computers, they may be networked together, as is well understood in these arts.

Source 6 may comprise an optical medium reader, a magnetic data reader, a communications link, or the like, or a combination thereof.

In an embodiment, analysis software 500 (not shown specifically in the figures but as described herein) comprises one or more modules, some of which may present a user interface comprising one or more forms, i.e. visual screen areas into, which a user enters data and on which the analysis software presents data such as those illustrated in FIGS. 7-15. In an exemplary embodiment, these forms include request for production on a request-by-request basis form FIG. 14, search keyword form FIG. 9, source of electronic documents form FIG. 7, and analysis forms FIGS. 10, 11, and 11a.

Figure 14:
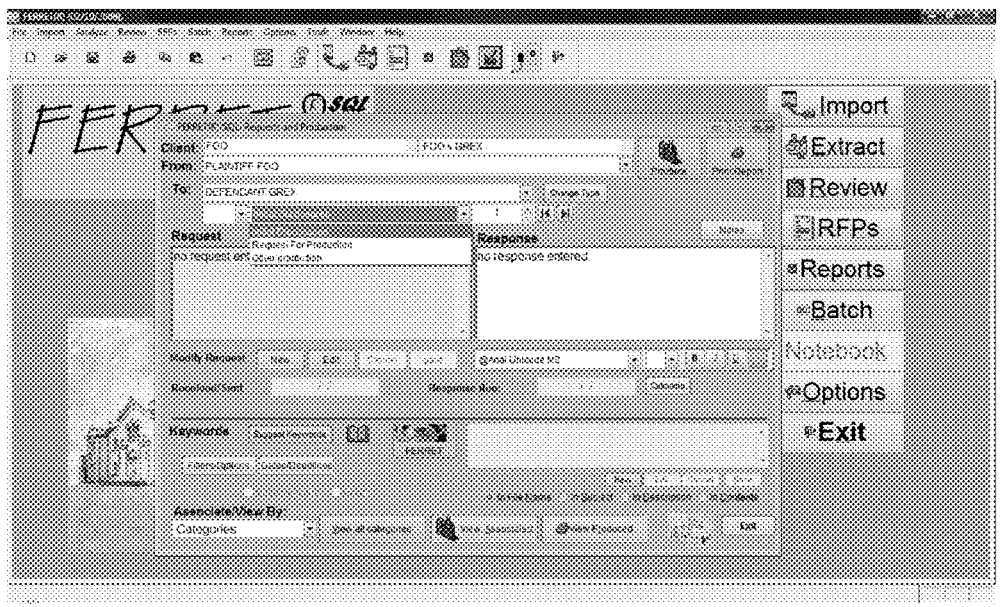

In a further preferred embodiment, presentation of electronic documents 5 to the user via an interface form, e.g. FIGS. 9, 10, 11a, 11b, and/or FIG. 14, may distinguish each electronic document 5 or set of electronic documents 5 to the user visually, e.g. via use of fonts, font characteristics such as bold or italics, background color, foreground color, or the like, or combinations thereof.

Referring additionally to FIG. 1, in exemplary embodiments, analysis software 500 further comprises an analysis module which is adapted to associate a set of user defined keywords, e.g. as entered via search keyword form, with each request for production on a request-by-request basis. In a currently preferred embodiment, request for production on a request-by-request basis form (FIG. 14) comprises a search by keyword input area for user convenience.

Figure 10:
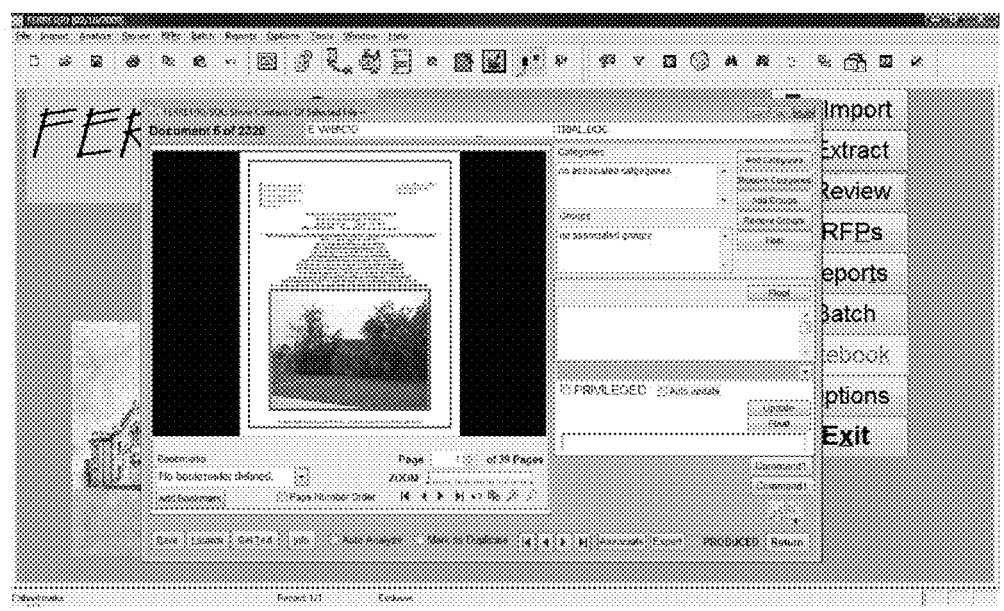

In exemplary embodiments, analysis software 500 further comprises a search module which is adapted to search document table 52 (FIG. 1) for stored electronic documents 5 which contain a predetermined number of a user created set of keywords such as those entered via, e.g., a search keyword form (FIG. 10). As discussed below, users may optionally set a threshold value and/or other weighting or relevance values to be used during such searches.

In exemplary embodiments, analysis software 500 further comprises an association module adapted to associate stored electronic documents 5 with a request for production on a request-by-request basis.

Referring additionally to FIG. 2, one or more tables in database 50 (FIG. 1) are used to store various information regarding stored electronic documents 5. As is well known, each table comprises one or more records and each record comprises one or more fields.

Categorization schema 300, in a preferred embodiment, comprises a set of records 301 in table 56 (FIG. 1), although numerous alternate arrangements may be used, such as using a flat file or an HTML file. Table 56 may further be a plurality of tables 56. Categorization schema 300 may consist of records 301 containing single keywords, natural text phrases, binary values, or the like, or combinations thereof. For example, the user can create content for capture into categorization schema 300 such as keywords "patent, misuse, obvious, trial" where each of these keywords would be in a single record. Alternatively, or additionally, categorization schema 300 may comprise one or more records 301 with longer natural text phrases such as "patent misuse" or "meeting with Fred Derf" or the like. Binary values, which may be important, e.g., in copyright infringement cases, may also be captured in fields of records 301.

Additional information may be associated with the entries in categorization schema 300, such as a weighting factor (which can be used to stress the relative importance of any one member of categorization schema 300 as compared to another member of categorization schema 300). Moreover, one or more antonym, synonym, and/or formative tables may be present and linked to categorization schema 300 such as by a key index field or keyword/phrase field.

It is understood that categorization schema 300 content may include multiple fields in addition to the keyword, natural text phrase, and/or binary values, e.g. key fields used for indexing and/or for relating records in table 56 to records in other tables.

By way of further example, table 52 (FIG. 1) comprises one or more records useful for locating stored electronic documents 5. In a preferred embodiment, these records comprise an indexing key field, a memo or blob or text field for containing text data extracted from stored electronic documents 5, and a document type field. Various other fields may be present, e.g. a source field to describe from where each stored electronic document 5 was obtained (e.g., a DVDROM or CDROM or flash drive); a stored field to describe where each stored electronic document 5 is to be found; one or more fields for processing (e.g., logical fields to indicate whether or not each stored electronic document 5 has been analyzed, reviewed, or the like; a description field to contain user created comments; and/or a data file descriptor helping to identify the type of file each stored electronic document 5 is, e.g. a word processing file.

Other tables may be present as well. Table 53 (FIG. 1) may comprise records containing litigant information. Table 55 (FIG. 1) may comprise records containing requests for production, each such record related back to table 52 (FIG. 1) such as with one or more key fields. Table 57 (FIG. 1) may comprise records contain grouping data to identify subsets of stored electronic documents 5 such as may be associated with queries, requests for production (e.g., records in table 55), and the like.

Figure 3:
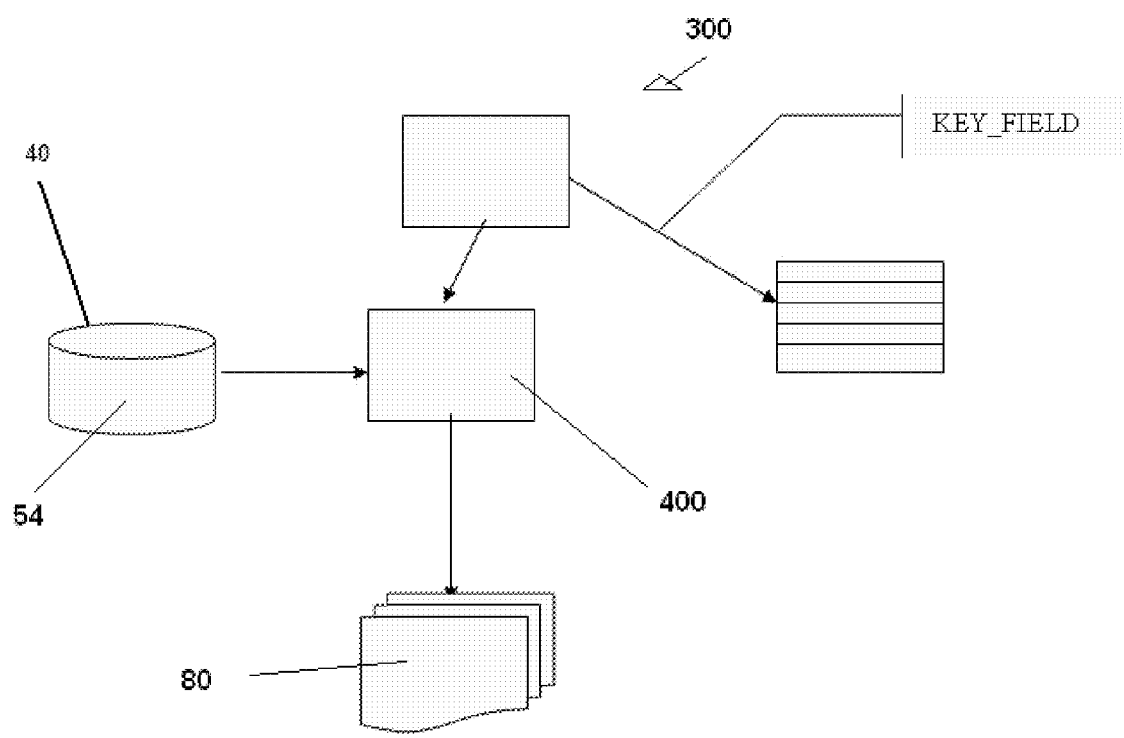
FIG. 3 is a schematic representation of an illustrative embodiment of a flow process for the claimed methods.
Figure 4:
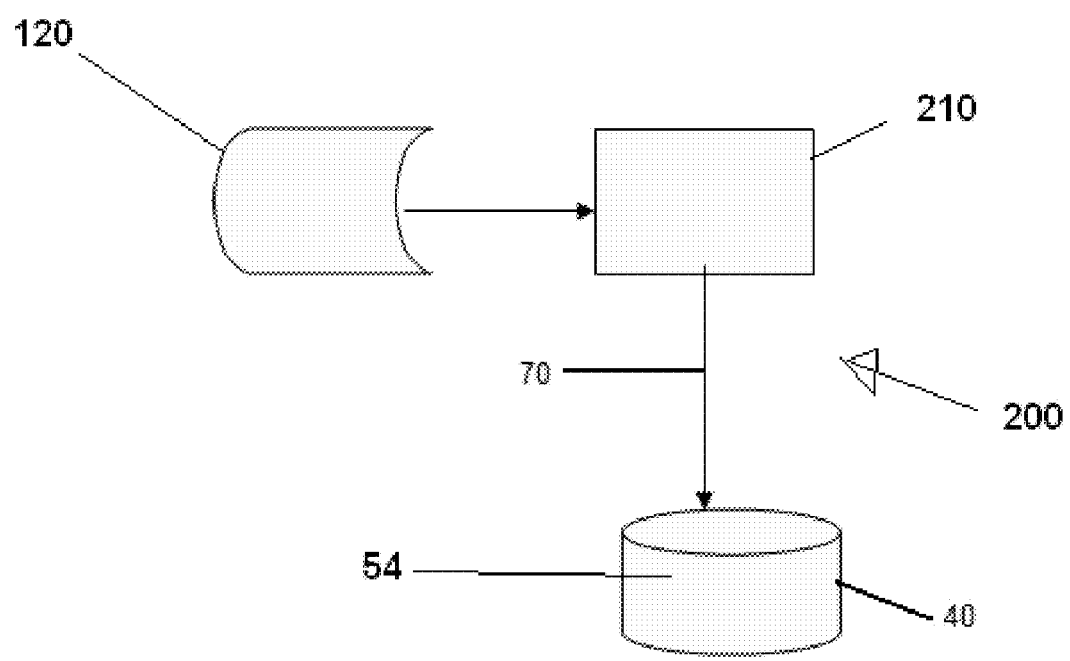
FIG. 4 is a schematic representation of an illustrative embodiment of a flow process for the claimed methods.
Figure 5:
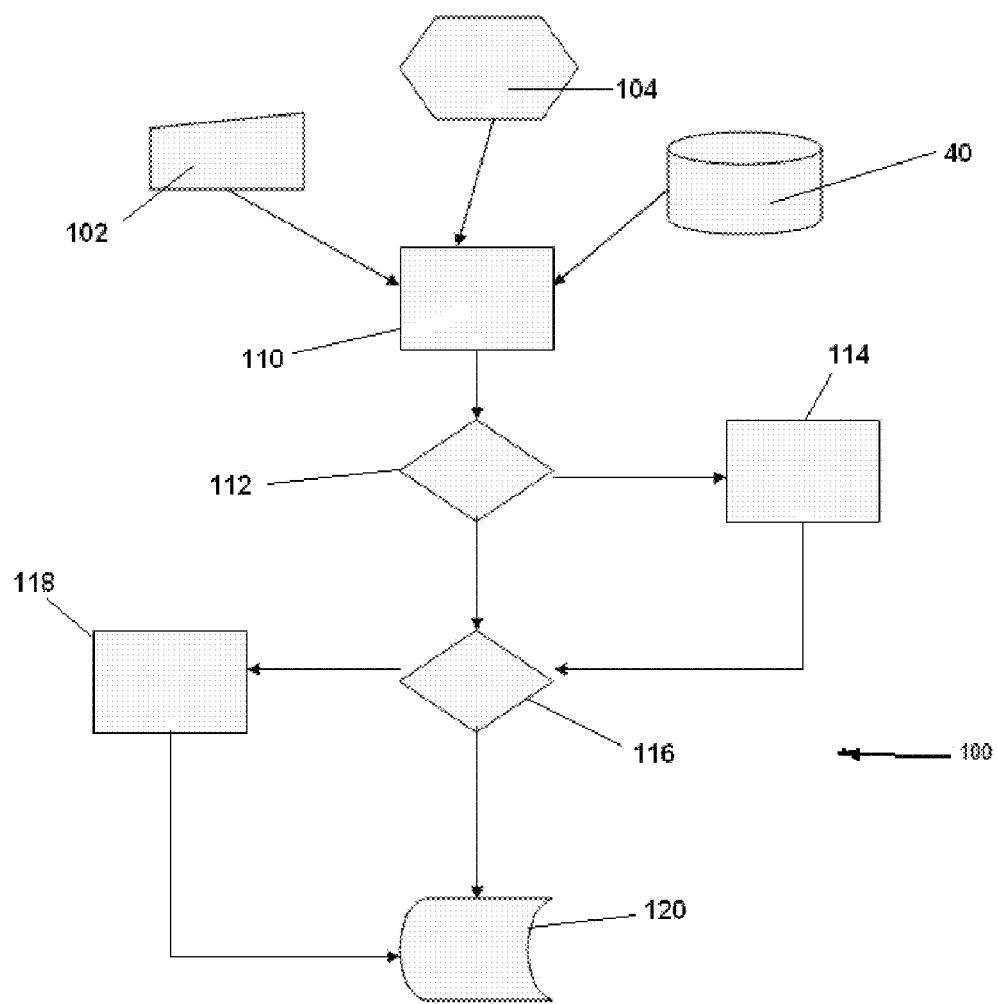
FIG. 5 is a schematic representation of an illustrative embodiment of a flow process for the claimed methods.

In the operation of exemplary embodiments, referring now to FIGS. 3-5, it is understood that these are illustrative and not meant to be limiting of the embodiments, where any such limiting is accomplished and defined by the claims.

In legal proceedings, requests for documents and things typically occur in one of two settings. First, certain documents may have to be produced to another party without court or party intervention or request, e.g. mandated initial disclosures. Second, certain documents may have to be produced to another party after a party's specific request, e.g. requests for production.

Referring especially to FIG. 5, electronic documents 5 are processed by using document acquisition software 100 operatively resident in first computer 10 (FIG. 1) to acquire one or more electronic documents 5. Such software can include operating system file copy utilities. Initially, software and/or the user determines where one or more specific acquired documents 5 of a set of acquired documents 5 is currently stored, e.g. on data store 40 (FIG. 1). This location may be static or dynamic. The acquisition may be of one or of a plurality of electronic documents 5, step 110, and may be processed interactively or in a batch. Document acquisition software 100 may acquire electronic document 5 from scanning process 102, including an optical scanner with or without an optical character recognition feature; data communication device 104, such as a wired or wireless network; data store 40, such as a magnetic or optical medium; or the like; or a combination thereof.

Document acquisition software 100 may also translate at least a portion of the scanned document from its original format into an intermediate format, steps 112, 114. For example, a document containing text may have the plain text alone stripped from the document such as may be present with a compound HTML document or a word processing document. Documents which are not in revisable form, e.g. PDF files or graphics files, may be processed using optical character recognition techniques, steps 116, 118. To the extent allowable by law, executable files and similar files, e.g. dynamic link libraries and other object files, may be disassembled and the disassembled file processed further, e.g. for pattern recognition.

Once acquired, electronic documents 5 and their intermediate format forms may be stored, step 120, into a predetermined location in a data store accessible to first computer 10 and/or second computer 20. Importantly, document acquisition software 100 must leave the original file unaltered.

Referring additionally to FIG. 4, stored electronic documents 5 may be processed by document parser 200 operatively resident in second computer 20 (FIG. 1). In a preferred embodiment, document parser 200 creates a set of parsed data 70 which are related to acquired electronic document 5, step 210. As used herein, the relation can be accomplished by creating one or more additional tables 54 (FIG. 1) comprising records comprising fields into which the parsed data are stored and related back to document table 52 (FIG. 1) such as by using key fields in records of tables 52 and 54. In a further embodiment, parsed data can be related by storing the parsed data as part of the records in document table 52. In a further embodiment, parsed data are stored in table 54 in records that comprise locating information for the associated electronic document 5.

A dataset comprising the storage location of acquired electronic document 5 and the output from document parser 200 derived from parsing acquired electronic document 5 is then created. The dataset may be temporarily resident only in random access memory or may additionally or exclusively be stored in a more permanent storage location of its own, e.g. in table 54 (FIG. 1). Additionally, other predetermined characteristics of electronic document 5 may be stored as part of the dataset, including the original date of creation of electronic document 5, the date of acquisition of electronic document 5, an operating system descriptor of the type of data contained in electronic document 5, and the like, or a combination thereof. As used herein the operating system descriptor may be used to indicate if electronic document 5 is in a text, executable, object, DLL, or specialized format such as word processing, graphics, HTML, PDF documents, or the like.

In one embodiment, during parsing, document parser 200 accesses categorization schema 300 (FIG. 2) such as by accessing table 56 (FIG. 1) and uses categorization schema 300 when generating parsed data. As described above, categorization schema 300 may include one or more single keywords, natural text phrases, and/or binary values. As will be understood, keywords or phrases might be relevant to the lawsuit or other legal task at hand.

Parsed data may also be processed into an intermediate format. For example, the processed data may originally be in a word processing data and the parsed data in plain text, or the original data may be in a first language such as Spanish and the parsed data translated into English. Additionally, the parsed intermediate data may be a metric (such as numbers of occurrences of the data in electronic document 5), metadata, or the like, or a combination thereof.

A predetermined set of data describing the parsed electronic document 5 are stored into document table 52 (FIG. 1) of database 50 (FIG. 1) which is accessible to second computer 20 (FIG. 1) such as by being a hard drive co-located with second computer 20 or accessible to second computer 20 such as via a data communications network. As used herein, a data communications network is a wired or wireless network such as a local area network, a WiFi network, a fiber optic network, or the like, or a combination thereof. In a preferred embodiment, the stored data comprise the parsed data but may also include other data relating to electronic document 5 such as where electronic document 5 is located, client information, case information, classification information (e.g., trade secret, confidential, and the like), or the like, or a combination thereof.

Referring now to FIG. 3, parsed document data are processed by document processor 400 operatively resident in third computer 30 (FIG. 1) according to categorization schema 300 (FIG. 2). One or more reports 80 may then be displayed, produced in hard copy format, and/or saved for later retrieval. These reports 80 may list each request for production along with the electronic document(s) 5 associated with each request for production.

In an embodiment, during processing by document processor 400, parsed data may be compared against data in categorization schema 300 (FIG. 2) using simple SQL SELECT and JOIN statements. For example, a proper SQL INNER JOIN of table 310 (FIG. 2), which comprises categorization schema 300 data, with table 54 (FIG. 1), which comprises parsed intermediate data, on a keyword/phrase/binary field in each of table 310 and table 54 will result in a single SQL construct to be queried against a matching decision criteria, e.g.

SELECT*FROM tb154 INNER JOIN tb1310
   ON tb154.Keyword=tb1310.Keyword
   WHERE tb154.Keyword="relevant"

During processing by document processor 400, parsed data may be compared against data in categorization schema 300 (FIG. 2) according to one or more weighting factors. These weight factor may be pre-assigned to a predetermined subset of categorization schema 300 or may be dynamically assigned for an analysis session. Using these weighting factors, document processor 400 can create a relevance factor which reflects the analysis of acquired electronic document 5 in view of the weight factors in the predetermined subset of categorization schema 300. The calculated relevance factor may then be associated with the correlative dataset for the acquired electronic document 5.

By way of example, a user may be creating a patent application for a document processor. The applicant obtains some number of prior art, e.g. patents and publications, and stores them electronically on a data store. The patent applicant wishes to analyze these against the patent applicant's invention which involves obtaining documents, parsing documents, assigning weights, and comparing. The keywords the patent applicant decides are important are, e.g.:

| INDEX_KEY | KEYWORD | WEIGHT | EXACT (e)/ VARIANTS (v) | UPPERCASE/ LOWERCASE/ MIXEDCASE | KEYWORD_TYPE (SOUNDEX (s)) | ALTERNATE |
|---|---|---|---|---|---|---|
| 1 | document | 10 | v | m | s | file |
| 2 | parse | 10 | v | m | s | |
| 3 | weight | 2 | e | m | s | |
| 4 | relevance | 5 | v | m | s | rank |
| 5 | compare | 7 | v | m | s | |

In this example, all keywords but "weight" are allowed variants, e.g. plurals, past forms, present participle forms, past participle forms, and/or gerundives. The analysis will give more weight, e.g. assign more importance, to the occurrence of the words "document" and "parse" than to the word "relevance."

As noted above, each entry in categorization schema 300 (FIG. 2) may be associated with one or more antonym, synonym, and/or formative tables may be present and linked to categorization schema 300 such as by a key index field or keyword/phrase field. In this example, the word "file" is to be considered equivalent to the word "document" and the word "rank" equivalent to the word "relevance." These entries could have just as easily been in an alternative, linked table, e.g. of synonyms.

In a further embodiment, document processor 400 may use category schema 300 (FIG. 2) to group sets of electronic documents 5 which exhibit similar characteristics. In this embodiment, a user can pre-configure and/or interactively configure sets of keywords, phrases, and/or binary values in categorization schema 300 to associate a first electronic document 5 with one or more other electronic documents 5 which exhibit similar characteristics.

By way of example, one side in litigation may wish to determine which electronic document 5 of electronic documents 5 tendered during discovery are relevant to certain issues for, e.g., use with a witness at deposition or trial. Similarly, by way of further example, a patent applicant may wish to determine which electronic document 5 of all or a subset of electronic documents 5 discovered during a pre-application process are relevant to certain claims or limitations. Parsed document data are processed by document processor 400, either on-the-fly dynamically or using stored results and compared against the decision criteria.

In a copyright example, binary data representing object code or sets of object code may be placed into categorization schema 300 (FIG. 2). Electronic documents 5 which are object, executable, or similar data may be disassembled or otherwise parsed into intermediate format which document processor 400 can then compare to categorization schema 300.

Additionally, electronic documents 5 which satisfy these decision criteria may be further analyzed to determine the presence or absence of other keywords and the result of such analysis used to ferret out other electronic documents 5 which may also be relevant to the decision criteria. For example, after an initial analysis, document processor 400 may compare all relevant documents and determine that some electronic documents 5 do not have certain keywords/phrases/values that exceed a threshold or have additional keywords/phrases/values that were not part of the decision criteria. A sample report is illustrated in FIG. 6. In the sample report, the numbers indicate the relevance factor calculated by document processor 400, e.g.) using data from categorization schema 300 (FIG. 2).

In a further embodiment, "relevance" may be context driven, e.g. using latent semantic indexing ("LSI"), a thesaurus, or the like, or similar concepts, either singly or in combination. As is well known, such techniques can aid in winnowing non-relevant search matches from relevant ones in areas where semantic ambiguity exists, e.g. did the searcher mean for "jaguar" to be an automobile or an animal? LSI techniques can be asserted as the initial process in document processor 400 or as a subsequent process in document processor 400 run against an initial result data set. For example, the technique can aggregate those members of the initial result data set with others of the initial result data set which are aligned using LSI. Similarly, a request might state "All documents related to Fred" and, for example, a thesaurus used to equate "document" with "email, fax, facsimile, letter, memo" and "Fred" with "Fred, Fred Smith, Freddy Smith, Fred A. Smith, F. A. Smith."

In a further processing step, document processor 400 can cull duplicative members of the initial result data set such as may be present when searching e-mail threads or multiple folders containing multiple files. This processing can involve using an initial member of the initial result data set which has the least data and finding all other members which contain that first member in totality, and then proceeding against all remaining members until a subset results containing one or more unique members collected as a related group of members.

In other embodiments, electronic documents 5 are processed, such as for further analysis and/or use in litigation, by obtaining a list of stored electronic documents 5, the list defining a set of stored electronic documents. For example, this list may be obtained from a file or directly from an operating system. These electronic documents 5 may be acquired at a first computer and stored at the first or a second computer in the same format as acquired. Acquiring may be from a scanning process, a data communication device, a data store, or the like, or a combination thereof. The list of stored electronic documents 5 may be derived from the acquired electronic documents.

Textual content are obtained from each stored electronic document 5 of the set of stored electronic documents 5 if that stored electronic document 5 contains textual content. The text may be extracted by software executing in computer 10

(FIG. 1) or by using other software, e.g. a call to a word processor software application.

A document type for each stored electronic document 5 of the set of stored electronic documents is determined and may simply be a document's extension. Document type may be determined from a set of descriptors of data contained in the acquired document, e.g. its extension or metadata, where the document type is usable to further process the stored acquired electronic document. For example, documents with an extension or type "DOC" may be operated on natively by a word processing software application. The document type, if determined, may be stored in a table, e.g. table 52 (FIG. 1), without altering the stored electronic document of the set of stored electronic documents.

A legal categorization may be associated with each stored electronic document 5 of the set of stored electronic documents. This is optional as such legal categorizations are not always present, e.g. whether or not such stored electronic document 5 has an associated evidentiary privilege or agree-upon protective evidentiary classification. The legal categorization, if determined, may be stored in a table, e.g. table 52 (FIG. 1), without altering the stored electronic document of the set of stored electronic documents.

For each stored electronic document 5 of the set of stored electronic documents, and without altering stored electronic document 5 of the set of stored electronic documents so as to keep its evidentiary value, a predetermined set of data describing stored electronic document 5 are stored into table 52 (FIG. 1) of database 50 (FIG. 1). The data may comprise the storage location of stored electronic document 5, its file name and extension, and its textual content, if present, as extracted above.

Users may associate groups of stored electronic documents 5 to create subsets of stored electronic documents 5 without disturbing the storage of the stored electronic documents 5 as originally acquired. For example, users, e.g. humans, may create an arbitrary n-level hierarchy which can be stored in taxonomy table 56 (FIG. 1) of database 50 (FIG. 1), e.g. a user defined categorization schema. This arbitrary n-level hierarchy can provide an independent means of grouping stored electronic documents 5. For example, a user may be allowed to associate a member of the n-level hierarchy with an arbitrary stored electronic document 5, without altering the stored electronic document 5 of the set of stored electronic documents, such as by use of a form like FIG. 10. The categorization schema may be single keywords, natural text phrases, and binary values. A second level of grouping may allow a user to group, i.e. associate, stored electronic documents 5 such as a group defined by the user to aggregate stored electronic documents 5 associated with sets of members of the n-level hierarchy.

For example, a user might create the following n-level hierarchy:

*
*
*
ATPQ-10
    Design
    Production
ATPQ-20
    Design
    Production

-continued

ATPQ-30
    Design
    Production
*
*
*

The user can the create the following groups:

*
*
*
DESIGN
    {ATPQ-10.Design, ATPQ-20.Design, ATPQ-30.Design}
PRODUCTION
*
*
*

This way, the user can rapidly define the DESIGN group as containing stored electronic documents 5 associated with the ATPQ-10.Design, ATPQ-20.Design, and/or ATPQ-30.Design members of the n-level hierarchy stored in taxonomy table 52 (FIG. 1), and a similar group for PRODUCTION. A request for production for "All documents associated with the design of foo-foo products" can then be associated with the DESIGN group and files produced and tracked based on the DESIGN group. A request for production for "All documents associated with the sales of foo-foo products" can then be associated with the PRODUCTION group and files produced and tracked based on the PRODUCTION group.

A weight factor may be assigned, e.g. by software, to a predetermined subset of the categorization schema 300 (FIG. 2) and a relevance factor created by software which reflects the analysis of stored electronic document 5 in view of the weight factors in the predetermined subset of the categorization schema. The relevance factor may then be associated with the correlative dataset for stored electronic document 5.

Users may further be allowed to create an arbitrary description of stored electronic documents 5 where the arbitrary description is stored as part of the predetermined set of data describing stored electronic document 5, e.g. in table 52 (FIG. 1).

In certain embodiments, obtaining textual content further comprises using a first software process to recognize a document as being an image file that may contain textual data, e.g. via optical character recognition ("OCR"). A second software process may then be used to process the recognized image file using optical character recognition to obtain textual information from the image file. This obtained textual information may then be stored and associated with the source electronic file 5.

Further, each stored electronic document may be examined, e.g. by a user or programmatically, to create descriptive data for each stored acquired electronic document, the descriptive data comprising, for example, a metric such as file size and metadata such as data of creation.

The descriptive data may comprise a date of creation of the stored electronic document, a date of acquisition of the stored electronic document, the source of the stored electronic document, and a storage location of the stored electronic document.

These descriptive data may then be captured into table 52 (FIG. 1) for each stored electronic document 5 of the set of stored electronic documents 5. For electronic discovery purposes, in certain embodiment the capture occurs without altering stored electronic document 5 of the set of stored electronic documents 5.

During examination of the captured electronic documents 5, a user or software may access categorization schema 300 (FIG. 2) and descriptive data may be generated in accordance with the accessed categorization schema. By way of example and not limitation descriptive data may be processed according to the categorization schema by creating a correlative dataset relating the categorization schema to the acquired document and outputting the correlative dataset to a output device. Typically, a non-neural network process is used to process the descriptive data according to a categorization schema to create an association between the acquired document and the categorization schema, e.g. user coding or thesaurus equivalences. Additionally, artificial intelligence techniques such as latent semantic indexing may be used to aggregate members of the initial result data set with others of the initial result data set which are semantically aligned.

In certain embodiments, each stored electronic document of the set of stored electronic documents is grouped by document type, without altering the stored electronic document of the set of stored electronic documents. An initial member of each of stored electronic documents of a group which has the least amount of data is located and then at least one other member of the group of stored electronic documents which contains all of the data of the initial member is located. A first sub-group is created comprising the initial member and each located data containing member and a second sub-group created comprising just the initial member. For each member of the first sub-group, a determination is made, e.g. programmatically, of which of the contents of the second sub-group and the located data containing member has the least amount of data and the contents of the second sub-group are replaced with the located data containing member if it has the least amount of data. Information for the second sub-group is stored in a table in the database. Using this method, duplicate files, e.g. e-mails or data files, may be located and marked. Importantly, the originally obtained source files are not deleted. However, during production or other functions, e.g. searching, a process can be limited to the non-duplicative files, thus speeding up the analysis or other processing.

Documents are typically gathered for production during litigation. As used herein, "request for production" includes those obligations to produce documents imposed by rules of procedure and those which arise, e.g., from more informal agreements. To review documents and produce documents relevant to a request or other obligation, e.g. initial disclosure obligations, a set of keywords associated with each request for production in a set of requests for production is generated. This can be programmatically by parsing a request for production or by a user. A predetermined set of data is searched for matches to one or more of the keywords, e.g. the captured textual content, user entered descriptions, file names, and the like, or combinations thereof. A sub-set of stored electronic documents is created as responsive electronic documents for those stored electronic documents which are located in the searching step, e.g. as a temporary table or array or other such construct, or a combination thereof. An association between each request for production and the sub-set is then created. This is typically programmatic but user input can be solicited as well.

Associations may include associations by the legal categorization. Such associations occur by assigning a categorization related to a legal evidentiary privilege, e.g. work product or client privilege, and/or by assigning a categorization related to a protective evidentiary classification, e.g. confidential or attorneys eyes only. These associations occur programmatically without altering the stored electronic document of the set of stored electronic documents. Using these associations, each responsive electronic document may be programmatically segregated by its categorization.

In certain embodiments, batching is providing whereby stored electronic documents 5 having one or more predetermined characteristics, e.g. having a given type or containing certain text, are associated and processed with other stored acquired electronic documents 5 having the same predetermined characteristics. For example, all stored electronic documents 5 having certain words in their textual content and/or descriptions may be batched to be marked as PRIVILEGED. As another example, all stored electronic documents 5 having certain words in their textual content and/or descriptions may be batched to be marked as being associated with a certain request for production.

On other embodiments, the user is presented with and allowed to view stored electronic documents for which textual content can not be obtained by computer 10 (FIG. 1) and prompted to provide a description of that stored electronic document. These user entered descriptions are then captured as part of the predetermined set of data describing the stored electronic document into the document table of the database.

Associations are then stored in a table in the database. Optionally, a report may be created detailing each created association.

As part of the litigation or similar production process, requests for production are captured into table 55 (FIG. 1) on a request-by-request basis. Descriptions of stored electronic documents are obtained from table 52 (FIG. 1) where the description defines a set of stored electronic documents 5. Textual content is obtained from each stored electronic document of the set of stored electronic documents if that stored electronic document contains textual content.

Document types are determined for each stored electronic document of the set of stored electronic documents and a legal categorization associated with each stored electronic document of the set of stored electronic documents. Without altering a stored electronic document of the set of stored electronic documents, for each stored electronic document of the set of stored electronic documents, a predetermined set of data describing the stored electronic document and a predetermined portion of the obtained textual content are stored into document table 52 (FIG. 1).

Document table 52 (FIG. 1) is searched for stored electronic documents 5 which contain a predetermined number of a set of keywords present in one or more user selected fields of the document table. For example, a user may search for the keywords in the document name, the document's user created description, the document's metadata, the document's text, or the like, or a combination thereof. Optionally, the set of search keywords is associated with each captured request for production on a request-by-request basis.

Users may be allowed to associate a resulting match from the search with a captured request for production on a request-by-request basis, e.g. using a form such as FIG. 14. The association of the resulting match from the search with the captured request for production on a request-by-request basis may then be captured into a table in dabatase 50.

As it is important to maintain the originally produced and obtained documents in their original form, a copy of each associated resulting match from the search with the captured request for production on a request-by-request basis may be created and copied into a predetermined electronic data file storage location, e.g. a file folder, CDROM, DVD-ROM, or the like. The copied files may be segregated during the copy process on a request for production on a request-by-request basis, by legal categorization, or the like, or a combination thereof.

In certain embodiments, the storage space required by each associated resulting match is determined and then a total storage space aggregated during the copy process. If the totaled, aggregated storage space reaches a predetermined limit, e.g. the maximum storage available on a CDROM, the copied files may then be segregated into sets of copied files using that limit on a per set basis. Segregating may further comprise prompting the user for a new medium on which to create the copies or programmatically creating a new folder into which to copy the copied files or the like or a combination thereof.

Figure 7:
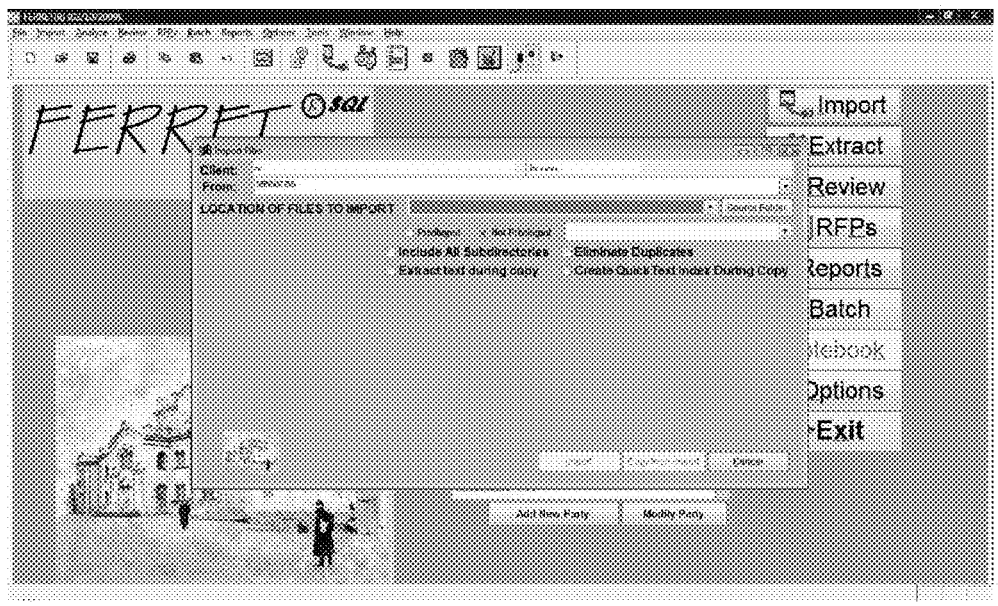
FIGS. 7-16 are exemplary illustrations of various user presented forms for an embodiment of a flow process for the claimed methods.

Referring now to FIG. 7, in an embodiment a user identifies a source of electronic documents 5 as well as the producer of those electronic documents 5. Data regarding these electronic documents 5 are then imported into table 52 (FIG. 1). Optionally, electronic documents 5 can be copied from their source, e.g. a CDROM medium, into another location, e.g. a file server. Further, privileges and other operations, such as elimination of duplicates or extraction of text, can be performed during the importation.

Figure 8:
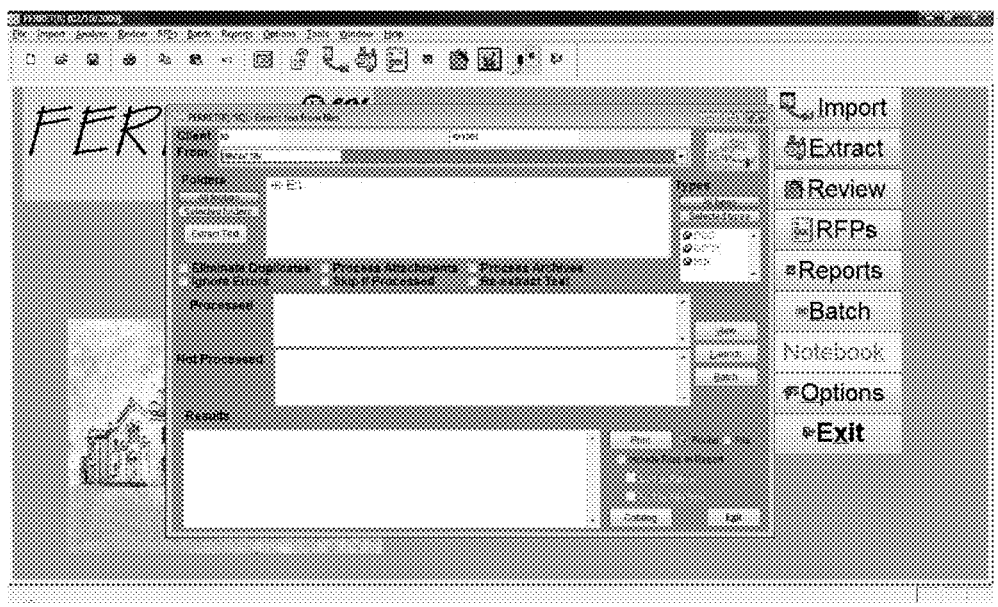

Referring now to FIG. 8, after electronic documents 5 are imported, i.e. data describing electronic documents 5 are captured into table 52 (FIG. 1), may be further processed, especially where text extraction was not performed during importation or if text extraction needs to be reperformed.

Figure 9:
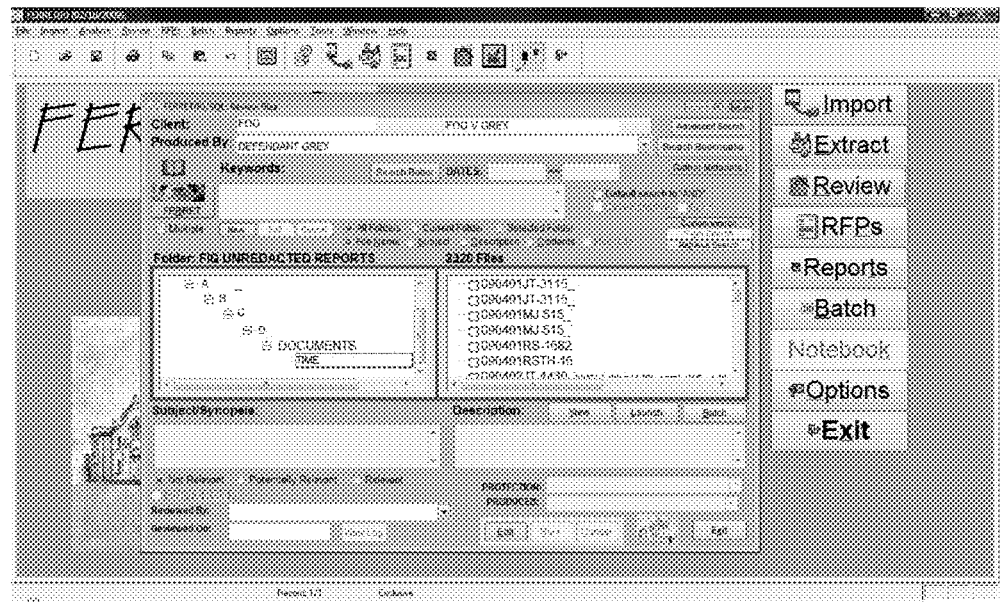

Referring now to FIG. 9, imported electronic documents 5 may be reviewed by a user and/or batch processing may be desired, such as to associate all electronic documents 5 that contain a word, phrase, or other characteristic with a category, group, privilege, or the like, or a combination thereof. Searches may be performed such as by keywords in the extracted text, the user entered descriptions, the filename, or the file metadata. One or more electronic documents 5 may be selected for viewing. Referring additionally to FIG. 10, once selected electronic documents 5 may be viewed such as in their native format using the program that created electronic documents 5 (e.g., Microsoft® Word®) and associated with groups, categories, privileges, or the like, or a combination thereof. A user can optionally create one or more bookmarks associated with the currently viewed electronic documents 5 and its current page.

Figure 11A:
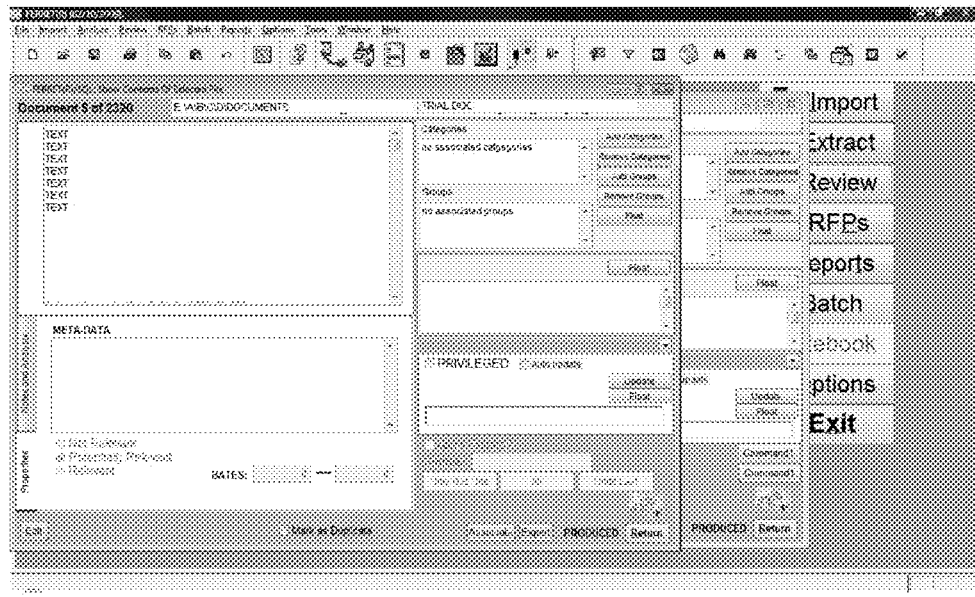
Figure 11B:
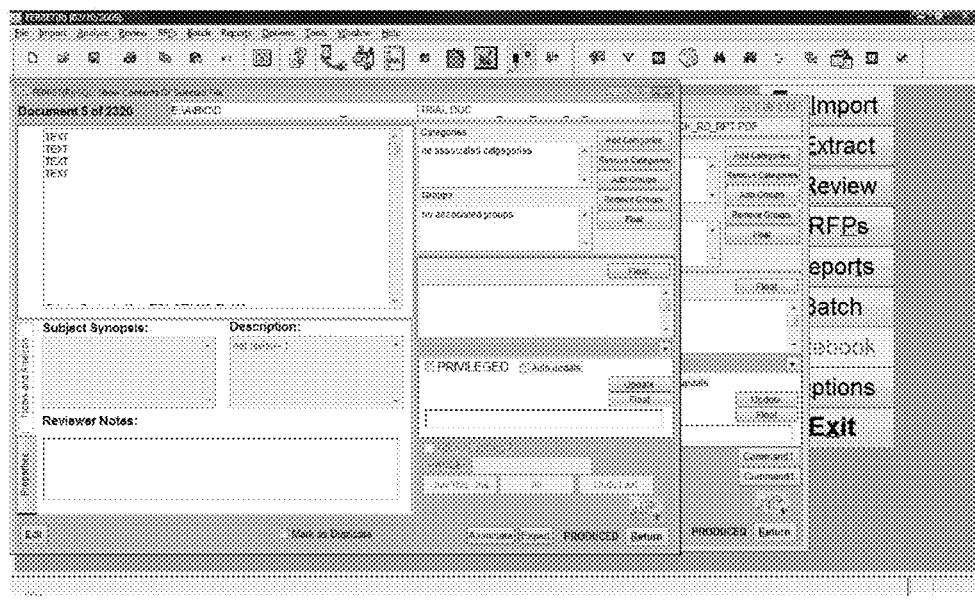

Referring additionally to FIGS. 11a and 11b, further data regarding electronic documents 5 can be viewed. For example, the extracted text may be viewed and corrected if the user has permissions to make such corrections.

Figure 12:
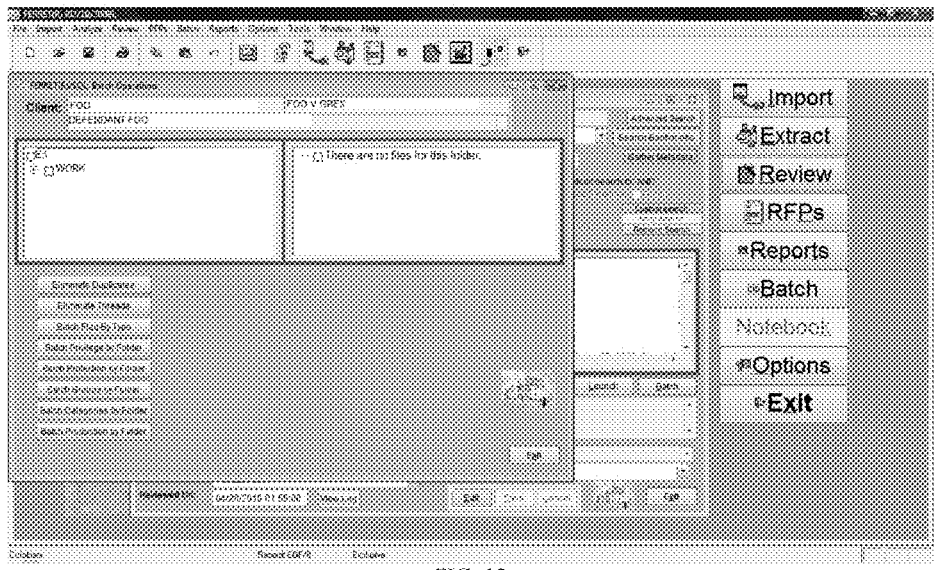

Referring now to FIG. 12, batch operations, as indicated in FIG. 12, may be performed such as on a group of electronic documents 5 located during a search or a group of electronic documents 5 associated by some other means such as in a folder.

Figure 13:
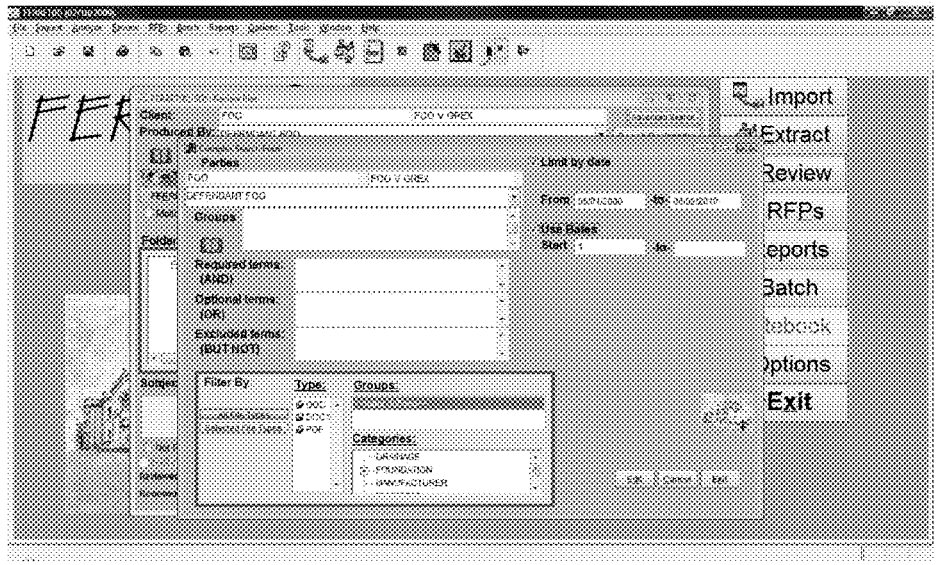

Referring now to FIG. 13, a user may further tailor searches by additional criteria, as shown in FIG. 13.

Figure 15:
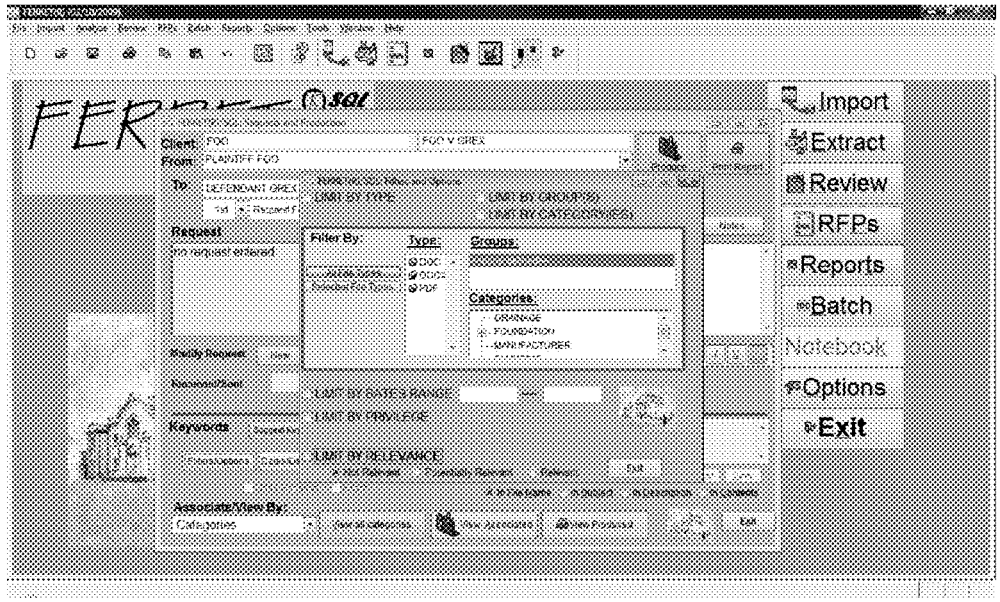

Referring now to FIG. 14, a user may enter or otherwise import requests for production and textual responses thereto. Searches may occur and the search results associated with each request for production. Referring additionally to FIG. 15, searches may be further narrowed by user selected filters.

Figure 16:
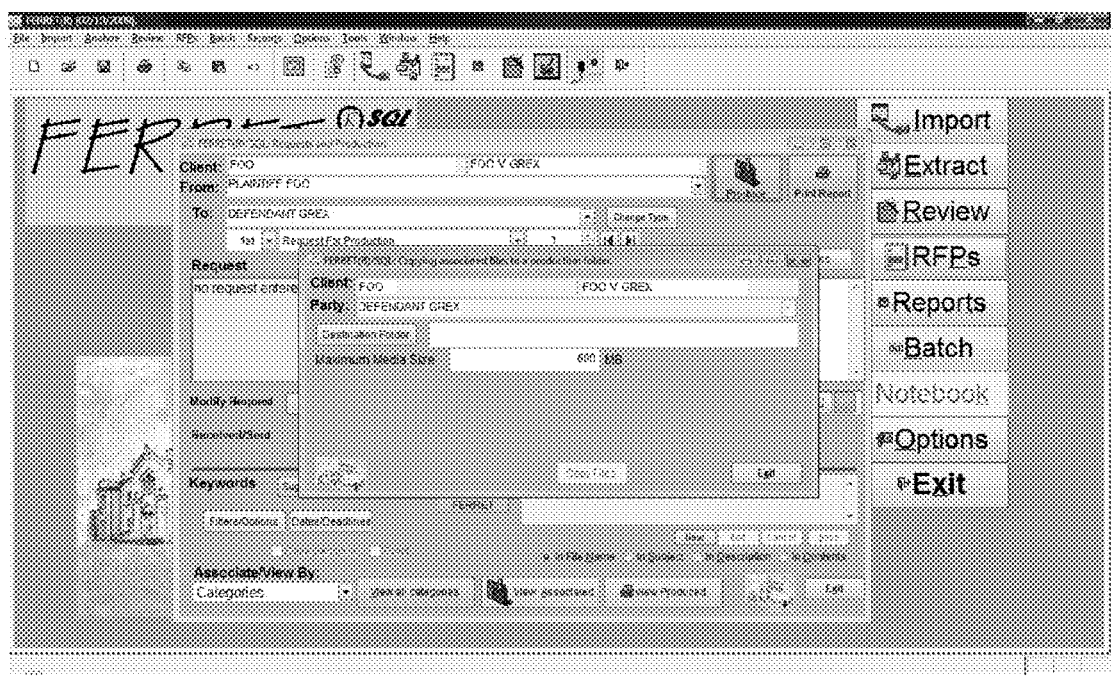

Referring additionally to FIG. 16, a desired set of electronic documents 5 may then be produced such as by copying onto a medium such as a CDROM or DVDROM medium.

The foregoing disclosure and description of the inventions are illustrative and explanatory. Various changes in the size, shape, and materials, as well as in the details of the illustrative construction and/or a illustrative method may be made without departing from the spirit of the invention.

I claim:

1. A method for processing electronic documents for use in a legal proceeding, comprising:
   a. storing a request for production of a document in a record in a table in a database;
   b. obtaining a set of electronic documents stored on a computer readable medium without altering a predetermined set of characteristics of the set of electronic documents with respect to the computer readable medium;
   c. using a first software process to obtain a first set of description data of each of the electronic documents;
   d. using a second software process to extract text content from each of the electronic documents to the extent that each electronic document contains extractable text content;
   e. storing the first set of description data in a first predetermined set of fields in a record in a table in the database, at least one of the predetermined set of fields of stored data containing data relating the stored first set of description data with its respective electronic document;
   f. storing the text content if present into a second predetermined set of fields in a record related to its respective electronic document in a table in the database;
   g. obtaining a document relevance decision criterion related to the request for production;
   h. analyzing the description data and the text content for responsiveness to the document relevance decision criterion; and
   i. creating an association in the database of each of the electronic document with the request for production if that electronic document is at or above a responsiveness threshold with respect to the document relevance decision criterion as determined by matching at least one of the description data and the text content with the decision criterion.

2. The method of claim 1, further comprising:
   a. creating a set of responsive documents for each request for production comprising each electronic document that is associated with each request for production;
   b. producing a copy of each responsive document of the set of responsive documents; and
   c. capturing data into a table in the database sufficient to track which electronic document was produced and when such production occurred.

3. The method of claim 2, further comprising creating a report containing an identification of each request for production and an identification of each responsive document produced that is responsive to each such request for production.

4. The method of claim 3, wherein the report comprises at least one of data stored in a table in the database or a formatted report for viewing.

5. The method of claim 1, further comprising obtaining externally generated text content for a stored electronic document if the stored electronic document does not contain textual content.

6. The method of claim 5, wherein the externally obtained text content is obtained manually from a user.

7. The method of claim 6, wherein the step of externally obtaining text content for the stored electronic document if the stored electronic document does not contain textual content further comprises:
   a. allowing the user to view the electronic document for which textual content cannot be obtained by the computer;

b. obtaining a description from the user of that stored electronic document; and c. storing the description as part of the predetermined set of data describing the stored electronic document into the document table of the database.

8. The method of claim 1, wherein the predetermined set of characteristics of the electronic document comprise at least one of the electronic document's file name, extension, content, size, creation date, and metadata.

9. The method of claim 1, wherein the second software process comprises at least one of optical character recognition or a version of software able to interrogate the electronic document.

10. The method of claim 1, further comprising:
a. repeating the method for each electronic document in the set of electronic documents;
b. using a software process to examine each electronic document of the set of electronic documents for a predetermined identifier; and
c. marking the electronic document's associated record in the database for each duplicate of an initially encountered electronic document as a duplicate of the initially encountered electronic document, based on the predetermined identifier.

11. The method of claim 1, further comprising:
a. creating a metric for the electronic document;
b. storing the metric as part of the descriptive data; and
c. using the metric when relating the electronic document with a request for production.

12. The method of claim 1, wherein obtaining a decision criterion related to the request for production comprises obtaining a set of decision criteria, the method further comprising:
a. storing the set of decision criteria in a table in the database, the stored set being related in the database to the table comprising the request for production;
b. storing a member of an n-level taxonomy in a table in the database;
c. creating an association between a member of the stored set of decision criteria and a record in table containing the member of the n-level taxonomy; and
d. creating a database relation between the member of the n-level taxonomy with the stored electronic document in the database based on the set of decision criteria, the relation comprising a null relation.

13. The method of claim 12, wherein the decision criteria are created by a user and stored in a table of the database.

14. The method of claim 12, wherein the relation between the member of the n-level taxonomy and the electronic document is based on the text content of the stored electronic document.

15. The method of claim 12, wherein the association of the electronic document with the request for production further comprises:
a. searching the description data for data matching a predetermined number of the decision criteria; and
b. associating the electronic document with the request for production if the number of the decision criteria contained in the description meets or exceeds a threshold.

16. The method of claim 1, wherein the description data comprises a categorization schema, the categorization schema comprising:
a. a first categorization related to a legal evidentiary privilege;
b. a second categorization related to a protective evidentiary classification; and
c. a null categorization.

17. The method of claim 16, further comprising:
a. assigning a weight criterion to a predetermined subset of the categorization schema;
b. programmatically creating a numeric relevance factor which reflects an analysis of the electronic document in view of the weight criterion; and
c. associating the numeric relevance factor with the descriptive data of the electronic document.

18. The method of claim 1, further comprising:
a. associating a set of text requirements with the request for production;
b. using a software process to determine a set of suggested search keywords based on a predetermined characteristic of the electronic document for use in associating the request for production with the electronic document;
c. performing a keyword search using the suggested set of search keywords; and
d. associating a subset of the electronic documents located using the keyword search with the request for production.

19. A system for processing electronic documents, comprising:
a. a data store;
b. a database resident in the data store, the database comprising:
1. a source table, the source table comprising a record, the record comprising a key indexing field and a description data field and
2. a request table, the request table comprising a record, the record comprising a key indexing field and a description data field;
c. a computer operatively in communication with the data store, the database, and a source of electronic documents; and
d. analysis software operatively resident in the computer, the analysis software further comprising:
1. a user interface comprising a request for production form for entry of a request for production based on a legal proceeding, a search keyword form, a source of electronic documents form, and an analysis form;
2. an analysis module configured to associate a set of user selected keywords with each request for production;
3. a search module configured to search a document table of the database for data associated with an electronic document which contain a predetermined number of the user selected keywords; and
4. an association module adapted to associate an electronic document with a request for production and store the association into a predetermined table of the database.

20. A method of processing electronic files for litigation, comprising:
a. obtaining a predetermined set of electronic files;
b. obtaining a predetermined set of descriptive data for each of the electronic files from a computer operating system;
c. importing the predetermined set of descriptive data into a first predetermined set of fields in a first predetermined set of records in a file table associated with a database;
d. extracting text from each of the electronic files if extractable text exists in that electronic file;
e. storing a request for production into a record in a request table of the database;

f. obtaining a search criterion associated with the request for production;
g. searching the file table for files that match the search criterion;
h. creating an associated set of electronic files from the first set of electronic files that meet the search criterion with the request for production; and
i. storing the associated set of electronic files in a table in the database along with a database relation for that associated set of electronic files with the request for production.

21. The method of claim 20, further comprising creating a copy of each of the associated electronic files in a predetermined location on an electronic medium.

22. The method of claim 21, further comprising:
a. obtaining a maximum medium size; and
b. creating a set of storage locations for the copy of each of the associated electronic files in the predetermined location on the electronic medium, the contents of each storage location not to exceed the obtained maximum medium size.

* * * * *